W. R. ELMENHORST.
Bag-Filters.

No. 157,593. Patented Dec. 8, 1874.

Witnesses:
Michael Ryan
Fred Haynes

W. R. Elmenhorst
by his Attorneys
Brown & Allen

UNITED STATES PATENT OFFICE.

WALTER R. ELMENHORST, OF JERSEY CITY, NEW JERSEY.

IMPROVEMENT IN BAG-FILTERS.

Specification forming part of Letters Patent No. 157,593, dated December 8, 1874; application filed October 23, 1874.

*To all whom it may concern:*

Be it known that I, WALTER R. ELMENHORST, of Jersey City, in the county of Hudson and State of New Jersey, have invented certain new and useful Improvements in Bag-Filters, of which the following is a full, clear, and exact description, reference being had to the accompanying drawing, forming part of this specification, and in which—

Figure 2:
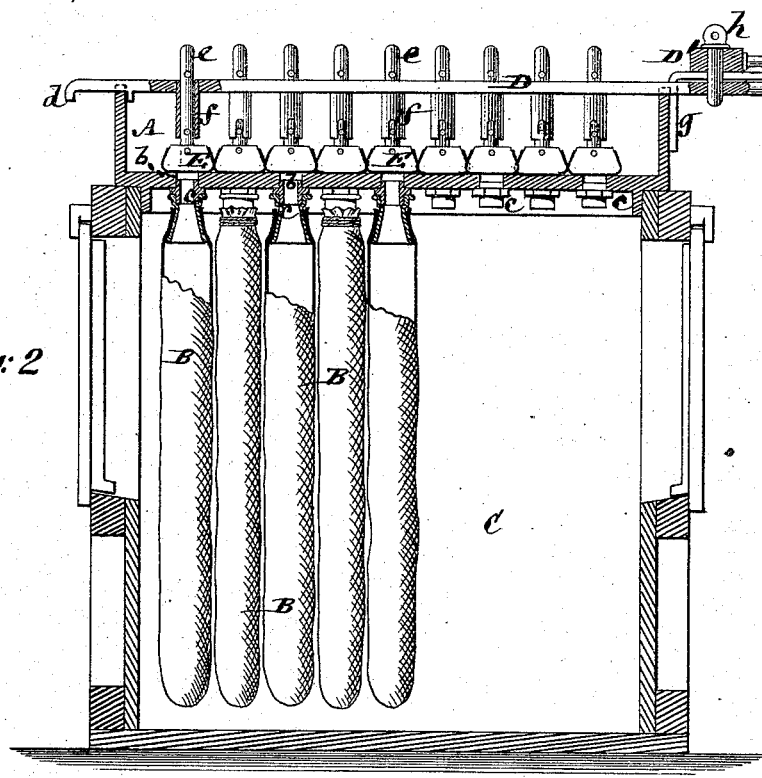
Figure 1:
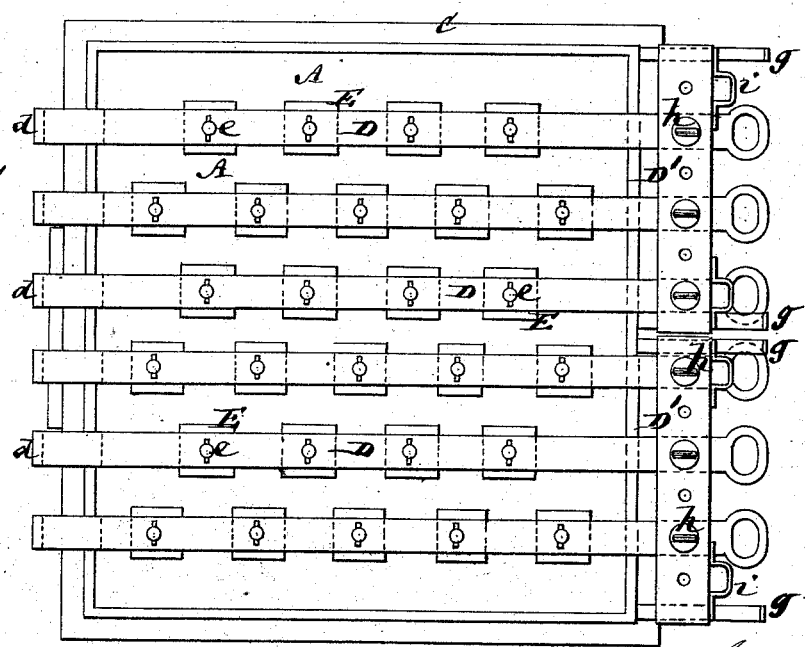

Figure 1 represents a plan of a bag-filtering apparatus constructed in accordance with my invention, and Fig. 2 a vertical section of the same from front to back.

This invention relates to apparatus known as bag-filters, extensively used in sugar-refineries, and applicable to other purposes, the same consisting of a number of pendent filtering-bags arranged within a receiver, and with their mouths in open communication with a basin or trough above. Applied to refining sugar, for which purpose the invention is more particularly designed, and will here be described, by way of illustration, in such relation, although adapted to refining various fluid substances, it may here be observed that the saccharine solution to be filtered is first run into the basin, and from thence into the filtering-bags, after which water is introduced into the basin to wash out saccharine solution remaining in the bags. There is a defect in such operation as the apparatus has heretofore been constructed, which it is the object of my invention to avoid. Thus the saccharine solution to be filtered is conveyed into the basin by means of a pipe, and the liquid or solution naturally enters those bags first which are nearest to such supply. The same effect takes place when water is introduced into the basin to wash out the remaining solution in the bags, which causes great waste of the cleansing-water, inasmuch as the bags which are first or most perfectly cleansed allow the water to run much more freely through them than do the other bags, besides adding more water than is desirable to the filtered solution. In remedy of this defect, the object of my invention is to close or open, at nearly the same time, all or as many of the apertures in the basin leading to the bags as may be desirable to secure an equal distribution of the solution to be filtered and of the cleansing or washing-out water, or either, as is desirable. To this end, or to these ends, the invention consists in a system of covers within the basin, controlling the apertures to the bags, and capable of operation in rows or series, either singly or collectively, whereby an equal or any desirable distribution of the solution to be filtered, or of the washing-out water, may be obtained; and the invention furthermore consists in certain means for actuating said stoppers.

In the accompanying drawing, A is the basin of a bag-filtering apparatus, into which the saccharine solution to be filtered, and afterward the water for washing out the remaining solution in the bags, is introduced by pipe, as usual. This basin is provided with a series of apertures, $b$, in its bottom, arranged in rows, and into which holes nipples $c$ are fastened, for the purpose of suspending the filtering-bags B within the receiver C, the fluid passing through the apertures $b$ into the filtering-bags.

After the filtering capacity of the bags, as regards the supply of them with saccharine solution, has been exhausted, there still remains a certain quantity of the saccharine solution in each bag, and which, in order to save, is washed out by allowing water to follow, and so that, when the washing is properly done, all, or very nearly all, of the saccharine matter can be saved, and only the mechanical impurities remain in the bags, after which the operation is repeated by substituting a clean set of bags. To do this effectually, both as regards the equal or required distribution of the solution and of the cleansing-water to the bags free from too copious a supply of water, which is both wasteful and objectionable in other respects, the basin A has a number of bars or slides, D, laid over its top, and guided by grooves in its edge. These bars are made capable of being moved backward or forward, or they may be arranged to have a lateral travel, each one over a line or row of the apertures $b$, and have on their one end a projection, $d$, to determine their length of motion. Said bars are provided with pins $e$, having a perfectly-free up-and-down motion within tubular projections $f$, the distance of said pins apart in each bar being equal to the distance of the apertures $b$ beneath the bar from each other. The lower ends of these pins are fitted with valves or covers E to the apertures $b$ of much greater area than said apertures. It is not necessary that these covers should be absolutely tight, but only moderately so. By sliding either bar D over the row of apertures $b$, to which its valves or covers E pertain, the whole line or row of apertures under said bar can readily be simultaneously opened or closed. In order to move all or any number of these bars D collectively, brackets $g$ may be secured to the basin A to form rests for sliding cross-bars D', united with the bars D by pins or bolts $h$, which drop through holes in said cross-bars and enter corresponding holes in the bars D, thereby securing as many of the bars D to each cross-bar as it is desirable to operate at a time, or, by removing the proper pin $h$, allowing of each bar D being separately operated. Handles $i$ may be furnished these cross-bars D' to facilitate the handling of them, and of the bars D connected with them.

Instead of the valves or covers E being connected, as described, with the bars D, they might be pivoted to the bottom of the basin, and all, or each row, or any number of them, be moved together by a suitable rod or rods. In fact, the construction of the valves or covers which control the apertures $b$, and of the means for operating said valves so long as they simultaneously control any number or rows of the apertures, or of all the apertures in the basin, may be almost indefinitely varied, and still give the same advantages over or as compared with the ordinary means heretofore employed, and which consist of independently-operated wooden plugs to the several apertures $b$.

By my invention, not only may the apertures $b$ be more rapidly opened and closed, but, by the independent opening of a number or series of bags simultaneously, or several series of bags, while the others are kept closed, or, when needed, opening all the bags at the same time, I am enabled to use the several filtering-bags in as nearly as possible an equal manner, and, by the controllable distribution effected, to use the water for afterward washing out the bags to great advantage, to the avoidance of a great quantity of unnecessary water, which not only is wasted, but, by mixing with the saccharine solution, is detrimental to the latter. By closing all the apertures $b$, the liquid introduced within the basin A will not run freely into the several bags, but will fill up the basin A, and subsequently, on suitably sliding the bars D either separately or in sets, or altogether, the liquid will run into so many of the bags as are open or exposed, and may be equally distributed throughout said bags. This applies equally to the filtering of the saccharine solution as to the washing out of the remaining solution in the bags.

I claim—

1. A bag-filtering apparatus in which the apertures through the bottom of the basin are controlled by connected valves or covers, for simultaneously opening or closing communication with a corresponding number of bags, or for simultaneously opening and closing connection with all the bags in the filter, substantially as specified.

2. The sliding bars D, having attached valves or covers, in combination with the basin A, the basin A having apertures $b$, controlled by the valves and the bags B, essentially as described.

3. The combination, with the valve-operating bars D, of one or more cross-bars, D', and the pins $h$, whereby the bars D may either be operated singly to open or close single rows of apertures $b$, or be operated in sets or series, or collectively, as desired, substantially as specified.

W. R. ELMENHORST.

Witnesses:
 HENRY T. BROWN,
 MICHAEL RYAN.